(12) United States Patent
Hyoung et al.

(10) Patent No.: US 8,742,888 B2
(45) Date of Patent: *Jun. 3, 2014

(54) COMMUNICATION APPARATUS HAVING HUMAN BODY CONTACT SENSING FUNCTION AND METHOD THEREOF

(75) Inventors: Chang-Hee Hyoung, Daejeon (KR); Jin-Bong Sung, Daejeon (KR); Sung-Weon Kang, Daejeon (KR); Jung-Hwan Hwang, Daejeon (KR); Duck-Gun Park, Daejeon (KR); Jin-Kyung Kim, Daejeon (KR); Sung Eun Kim, Daejeon (KR); Tae Wook Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 335 days.

This patent is subject to a terminal disclaimer.

(21) Appl. No.: 13/232,925

(22) Filed: Sep. 14, 2011

(65) Prior Publication Data

US 2012/0003929 A1 Jan. 5, 2012

Related U.S. Application Data

(63) Continuation-in-part of application No. 12/096,365, filed as application No. PCT/KR2006/005247 on Dec. 6, 2006, now Pat. No. 8,054,159, application No. 13/232,925, which is a continuation-in-part of application No. 12/679,466, filed as application No. PCT/KR2008/005502 on Sep. 17, 2008, now abandoned.

(30) Foreign Application Priority Data

Dec. 8, 2005 (KR) .......... 10-2005-0120053
Aug. 9, 2006 (KR) .......... 10-2006-0075295
Sep. 21, 2007 (KR) .......... 10-2007-0096881

(51) Int. Cl.
G05B 19/00 (2006.01)

(52) U.S. Cl.
USPC ........... 340/5.64; 340/5.1; 340/5.2; 340/5.65; 340/10.34; 340/573.1; 455/41.1; 345/173

(58) Field of Classification Search
USPC .................. 340/5.1, 5.2, 5.65, 5.64, 825.72; 455/41.1; 600/483; 345/173, 156
See application file for complete search history.

(56) References Cited

U.S. PATENT DOCUMENTS 8,054,159 B2 * 11/2011 Hyoung et al. ............. 340/5.64
2006/0153109 A1 7/2006 Fukumoto et al.
(Continued)

FOREIGN PATENT DOCUMENTS

JP 2004-127173 A 4/2004
JP 2005-004383 A 1/2005
(Continued)

OTHER PUBLICATIONS

Eric Wade et al., "Electrostatic Analysis and Design of a Cable-Free Body Area Network of Sensor Nodes Using 2D Communication over Conductive Fabric Sheets", Intelligent Robots and Systems, 2005 (IROS 2005), Aug. 2, 2005, pp. 3642-3647.

(Continued)

*Primary Examiner* — Brent Swarthout

(57) ABSTRACT

Provided is a communication apparatus having a human body contact sensing function and method. The apparatus includes: an electrode that comes in contact with the human body; a contact sensor coupled to the electrode that instructs the CPU to perform an initial operation if contact with the human body is sensed; and a data processing unit that receives a control signal from the CPU to select whether to transmit or receive data, and performs a transmitting or receiving operation according to the control signal. To reduce power consumption in a stand-by state before body contact is made when using a human body as a communication medium, a human body contact sensor is included to minimize power consumption of a micro processing unit and a transmitter/receiver circuit until contact occurs. Minimizing power consumption when in a stand-by mode by using a contact sensor with low power consumption extends stand-by time.

7 Claims, 13 Drawing Sheets

(56) References Cited

U.S. PATENT DOCUMENTS

2006/0258408 A1* 11/2006 Tuomela et al. ............ 455/569.1
2008/0259043 A1* 10/2008 Buil et al. ..................... 345/173
2008/0284607 A1   11/2008 Hyoung et al.
2009/0247883 A1* 10/2009 Miyazaki et al. ............. 600/483

FOREIGN PATENT DOCUMENTS

| JP | 2005-159618 A | 6/2005 |
| JP | 2006-318485 A | 11/2006 |
| KR | 1020030018523 A | 3/2003 |
| KR | 1020070061251 A | 6/2007 |
| KR | 1020070090412 A | 9/2007 |

OTHER PUBLICATIONS

Nobuyuki Matsushita et al., "Wearable Key: Device for Personalizing nearby Environment", Proceedings of the Fourth International Symposium on Wearable Computers, Oct. 16, 2000, pp. 119-126, IEEE.

* cited by examiner

COMMUNICATION APPARATUS HAVING HUMAN BODY CONTACT SENSING FUNCTION AND METHOD THEREOF

CROSS-REFERENCES TO RELATED APPLICATIONS

This application is a continuation in part of U.S. patent application Ser. No. 12/096,365, now U.S. Pat. No. 8,054,159, filed on Jun. 5, 2008, which is the National Phase of PCT Application No. PCT/KR06/05247, filed on Dec. 6, 2006, which claims the benefit of Korean Patent Application No. 10-2005-0120053, filed on Dec. 8, 2005 and Korean Patent Application No. 10-2006-0075295, filed on Aug. 9, 2006, in the Korean Intellectual Property Office, and also a continuation in part of application Ser. No. 12/679,466, now abandoned, filed on Mar. 22, 2010, which is the National Phase of PCT Application No. PCT/KR2008/005502, filed on Sep. 17, 2008, which claims the benefit of Korean Patent Application 10-2007-0096881, filed on Sep. 21, 2007, the disclosures of which are incorporated herein in their entirety by reference.

BACKGROUND OF THE INVENTION

The present invention relates to a communication apparatus that allows a controller and a transmitter/receiver module for human body communication to enter a normal operation state from a stand-by mode by sensing contact or approach of human body by using a method of transmitting a signal between devices which are mounted on or placed near the human body as a communication medium, and a method thereof. Further aspects of the invention relate to a human body communication apparatus that is in contact with a human body to conduct a communication, and more particularly, to a human body communication apparatus that senses the contact with or proximity to a human body to operate a controller and a transceiver module, both of which are used for human body communication and are in a standby mode, into a normal state.

Aspects of the present invention were supported by the IT R&D program of MIC/IITA [2006-S-069-03, Development of Wearable System Using Physiological Signal Processing].

A communication input/output apparatus which senses the contact of the human body may apply to mobile devices such as hand phones, MP3 players, digital cameras, etc. A conventional system for human body communication, in which devices mounted on or placed near a human body communicate with one another through the human body as a communication medium, allows a communication channel to be formed when in contact with the human body. However, it is uncertain when a device embedded with a human body communication module will come in contact with the human body, and thus a signal needs to be periodically checked so as to find out whether a communication channel has been formed between corresponding devices. In this case, even if there is no contact with the human body, the device itself cannot recognize whether there is contact with the human body. Therefore, not only a receiving-end circuit that converts a weak signal received through the human body into a digital signal that can be processed by a micro-controller but also a micro-controller that performs a control operation has to be constantly or periodically in a wake-up state to reduce power consumption.

When a transmitter has data to be sent, even if a human body communication micro-controller initially operates after data is output to an external control signal or a designated memory area, a transmitter circuit that converts the digital signal received from the micro-controller into a signal to be output to the human body has to be operated in a normal state until contact with the human body has been made. That is, in order to check whether a channel is formed, the transmitter circuit has to operate even if there is no contact with the human body, which leads to unnecessary power consumption.

As described above, power is unnecessarily consumed because a transmitter/receiver circuit and a micro-controller for controlling the transmitter/receiver circuit have to constantly or periodically be in the normal state so as to determine whether a channel has been formed in transmitting and receiving processes even if there is no contact with the human body.

In further detail, in the case of the transmission unit including data to be transmitted, the micro controller used for human body communications applies an external control signal and data to a predetermined memory area. Therefore, a receiving circuit for confirming whether communication channels are formed, as well as a transmission circuit, should continue to operate normally. Here, although the transmission circuit starts to operate, the transmission circuit has a function to convert a digital signal received from the micro controller into a signal for applying to the human body before the transmission circuit is in contact with the human body. That is, the transmission circuit and the receiving circuit are operated to confirm whether the communication channels are formed even when there is no contact with the human body. Therefore, the power is consumed unnecessarily in the conventional devices using human body communications.

As described above, the conventional human body communication apparatuses have a problem that the transmission and receiving circuits and the micro controller for controlling the transmission and receiving circuits should be always or periodically be in a normal operation mode even when the transmission and receiving circuits are not in contact with a human body. The transmission and receiving circuits should operate to confirm whether communication channels are formed. This indicates that power is unnecessarily consumed in the conventional human body communication apparatuses. Also, the communication input/output apparatus that may sense simple human body contact has a problem that the unnecessary power consumption is caused in modems and transceiver modules for human body communication since it is impossible to interpret the exact intention of a user when the user approaches the device for the purpose of other uses other than human body communications.

When there is no contact of a user with the human body communication apparatus having a contact sensor unit, the human body communication apparatus may reduce its consumption of electric power, which is used to judge whether the communication channels are formed, by applying the human body communication apparatus with a contact sensor unit to portable devices such as a hand phone. However, when a human body approaches and contacts with electrodes of the devices for the purpose of other operations, for example contacts for other uses of a user such as communications, listening to music, or taking photographs, these human body communication apparatuses sense the contact and approach to the human body, regardless of the intentions of a user, to generate a control signal. Therefore, there is a need to prevent the unnecessary power consumption since the human body communication apparatuses transmit/receive data to/from the external devices using the control signal.

BRIEF SUMMARY OF THE INVENTION

The present invention provides an apparatus that has a reduced unnecessary power consumption of a transmitter circuit, a receiver circuit, and a micro-controller that controls the transmitter and receiver circuits, wherein the power consumption may be reduced before contact with a human body is made when communication is achieved through the human body as a communication medium, and a method thereof.

The present invention provides an apparatus that has a reduced unnecessary power consumption of a transmitter circuit, a receiver circuit, and a micro-controller that controls the transmitter and receiver circuits, wherein the power consumption may be reduced before contact with a human body is made when communication is achieved through the human body as a communication medium, and a method thereof.

According to an aspect of the present invention, there is provided a communication apparatus having a human body contact sensing function wherein the communication apparatus performs communication in contact with a central processing unit and a human body, the communication apparatus comprising: an electrode that comes in contact with the human body; a contact sensor that is connected to the electrode, and instructs the central processing unit to perform an initial operation if contact with the human body is sensed; and a data processing unit that receives a control signal from the central processing unit so as to select whether to transmit or receive data, and performs a transmitting or receiving operation according to the control signal.

In the aforementioned aspect of the present invention, the contact sensor may instruct the central processing unit to perform the initial operation by sensing direct contact between the human body and the electrode or by sensing approach of the human body.

In addition, the data processing unit may perform transmitting and receiving of the data by using a time-division method.

In addition, the data processing unit may further perform a process by using a continuous frequency modulation method in which the same carrier frequency is used when the data is transmitted and received.

In addition, the data processing unit may further perform transmitting and receiving of the data by using a continuous frequency modulation method in which a transmission carrier frequency is different from a reception carrier frequency. According to another aspect of the present invention, there is provided a communication apparatus having a human body contact sensing function wherein the communication apparatus performs communication in contact with a central processing unit and a human body, the communication apparatus comprising: an electrode that comes in contact with a human body; a sensor that converts an electric field input through the electrode into an electric signal; a data processing unit that restores the electric signal into original data to be transmitted to an external device, and converts data received from the external device to output the received data to the electrode; and a contact sensor that generates and outputs a sensing signal used to detect whether contact is made with the human body and indicates the result of detection so that the external device can recognize the result, and that comprises a multi-channel sensor if the electrode is provided in plural.

In the aforementioned aspect of the present invention, the external device may perform an initial operation in response to the sensing signal.

According to another aspect of the present invention, there is provided a communication method having a human body contact sensing function wherein the communication method performs communication in contact with a central processing unit and a human body, the communication method comprising: determining whether contact is made with the human body; instructing the central processing unit to perform an initial operation if the determination result is positive; and transmitting or receiving data in response to a control signal from/to the central processing unit which has performed the initial operation.

According to another embodiment of the present invention, a human body communication apparatus may include a plurality of contact sensor units including a plurality of electrodes configured to contact a human body and having conductivity, a plurality of electrostatic capacity sensor units coupled to the electrodes and configured to sense a change in electrostatic capacity as a result of contact with the human body, and further configured to generate a contact signal using the sensed electrostatic capacity, a signal analyzer unit configured to analyze the contact signal received from the contact sensor units to determine a user intent, a central processing unit configured to process information received through the electrodes, and a control signal generator unit configured to generate a first control signal as the analysis result in the signal analyzer unit, wherein the first control signal is transmitted to the central processing unit as a wake-up signal to control a power state of the central processing unit.

The plurality of electrostatic sensor units may be configured to sense direct contact between the human body and a plurality of the electrodes, or the approach of the human body. The embodiment may include comprising a data signal processor unit configured to transmit and receive a data signal to and from external devices, and the data signal processor unit may be configured to transmit and receive the data signal through a time division multiplex system. Alternatively, the data signal processor unit may be configured to transmit and receive the data signal through a frequency division system using a frequency modulated continuous wave mode in which a transmitting carrier frequency and receiving carrier frequency are different to each other.

In an embodiment, the data signal processor unit may include a reception unit for restoring the baseband signal sensed from the human body to an original digital signal; a transmission unit for applying the received data signal received from the external device as a baseband signal to the human body; and a switch unit coupled to the transmission unit and the reception unit to select the transmission to the human body or the reception from the human body according to a second control signal.

The data signal may include a UWB signal having a very short pulse cycle as a spreading and channel-encoded signal in which characteristics of the communication channels are reflected.

In some embodiments of the invention, the data signal processor unit may include an electric field sensor unit configured to convert the received data signal, in the form of an electric field signal induced from the contact sensor unit, into an electrical signal when there is no contact with the human body; a reception unit configured to restore the electrical signal received from the electric field sensor unit to an original digital signal; and a transmission unit configured to apply the transmitted data signal, received from the external device, as a baseband signal to the human body.

In an embodiment, the data signal processor may include a reception unit configured to subject the received data signal received from the contact sensor unit using a continuous frequency demodulation process, and further configured to restore the received data signal to an original digital signal; a transmission unit configured to subject the transmitted data signal, in the form of a digital signal received from the external device, to a continuous frequency modulation process, and further configured to apply the transmitted data signal to the human body; and a duplexer configured to divide paths of the transmitted data signal and the received data signal.

In addition, the transmission unit may be configured to process the transmitted data signal inputted from the external device with a frequency modulated continuous wave mode using the same carrier frequency. The reception unit may also processes the received data signal transmitted from the contact sensor unit with the frequency demodulated continuous wave mode.

The details of one or more embodiments are set forth in the accompanying drawings and the description below. Other features, objects, and advantages will be apparent from the description and drawings, and from the claims.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, exemplary embodiments of the present invention will be described with reference to the accompanying drawings.

Figure 1:
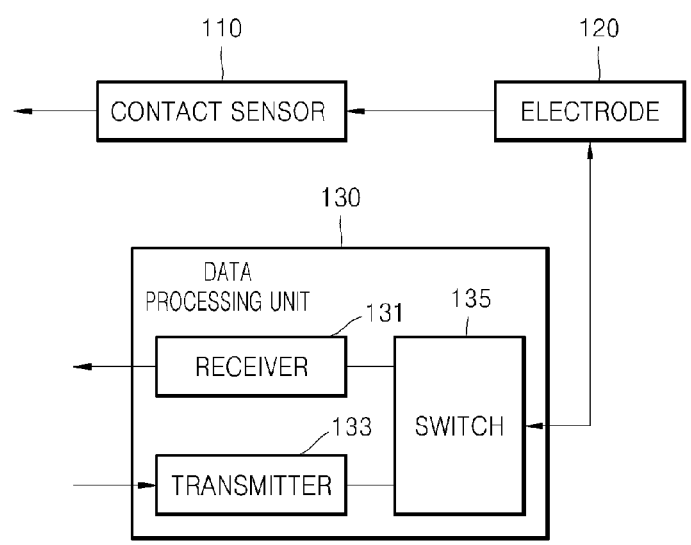
FIG. 1 is a block diagram illustrating a configuration of a communication apparatus having a human body contact sensing function according to an embodiment of the present invention.
Figure 12:
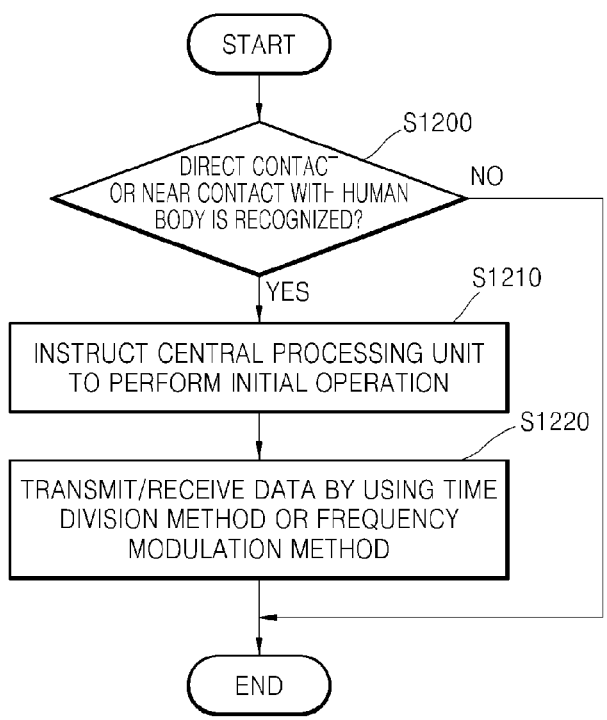
FIG. 12 is a flowchart illustrating a communication method of sensing human body contact according to an embodiment of the present invention.

FIG. 1 is a block diagram illustrating a configuration of a communication apparatus having a human body contact sensing function according to an embodiment of the present invention. FIG. 12 is a flowchart illustrating a communication method of sensing human body contact according to an embodiment of the present invention. According to an embodiment of the present invention, a contact sensor is provided to wake up a micro-controller by connecting a sensor having a contact sensing function to an electrode for transmitting/receiving a signal with a human body, thereby detecting contact or approach of the human body. Since a human body communication module operates by using human body contact, power is not consumed as a micro-controller and transmitter/receiver circuits operate in the absence of human body contact. As a result, a portable device using the human communication module can have an improved stand-by time.

A contact sensor 110 determines whether there is contact with a human body, that is, whether an electrode 120 directly comes in contact with the human body, or whether the electrode 120 comes within a recognizably close distance, thereby making contact with the human body in operation S1200. When the determination result shows that contact is made, the contact sensor 110 outputs a signal indicating that contact is made to a central processing unit such as a micro-controller, and thus instructs the central processing unit to initially operate a suspended operation in operation S1210. Accordingly, when a switch 135 receives the signal output from the central processing unit, if the signal output from the central processing unit indicates signal reception, the switch 135 allows a signal input through the electrode 120 to be passed on to a receiver 131. If the signal output from the central processing unit indicates signal transmission, the switch 135 allows a signal output from a transmitter 133 to be connected to the electrode 120, thereby performing an overall operation in operation S1220.

Figure 2:
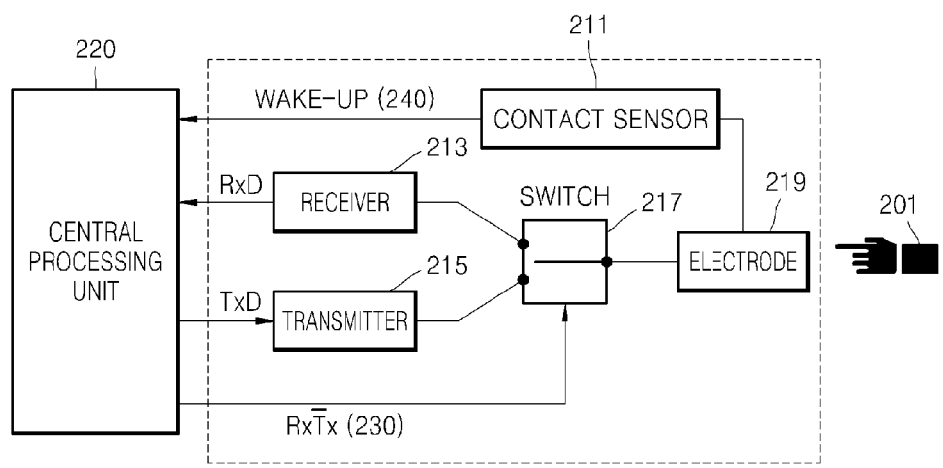
FIG. 2 is a block diagram illustrating a configuration of a time division multiplexing communication apparatus having a human body contact sensor according to an embodiment of the present invention.

FIG. 2 is a block diagram illustrating a configuration of a time division multiplexing communication apparatus having a human body contact sensor according to an embodiment of the present invention.

Figure 6:
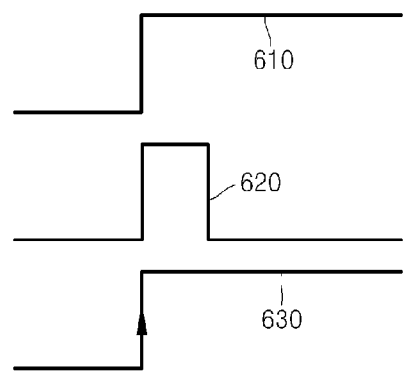
FIG. 6 illustrates an example of an output signal of a contact sensor.

Referring to FIG. 2, when a human body 201 comes in contact with an electrode 219 for a transmitting/receiving operation, a contact sensor 211 detects this, and outputs a wake-up signal 240 to a central processing unit 220. Then, the central processing unit 220, which has been in a sleep mode or has performed another operation except for human body communication, initially performs a receiving operation for the human body communication. When operating in a receiving mode, the central processing unit 220 outputs a signal Rx $\overline{\text{Tx}}$ 230 to a switch 217 that completes a transmitting/receiving path, so that an electrical path is formed between the electrode 219 and a receiver 213. The wake-up signal 240 may be continuously output while contact is maintained after initial contact is made, may be output having a constant pulse width at the moment when contact is made, or may be output using a positive or negative trigger method. This is shown in FIG. 6. The central processing unit 220 is set to no longer be under the influence of the wake-up signal 240 once the central processing unit 220 is in the wake-up state. When a sensing operation of the contact sensor 211 is too sensitive, a channel is formed, and a load condition of the electrode 219 changes according to whether the switch 217 for a transmitting/receiving operation is driven. Such change may produce erroneous operations of the contact sensor 211, and thus the wake-up signal 240 of the contact sensor 211 has to be ignored if the wake-up signal 240 is produced after contact is made.

Figure 7:
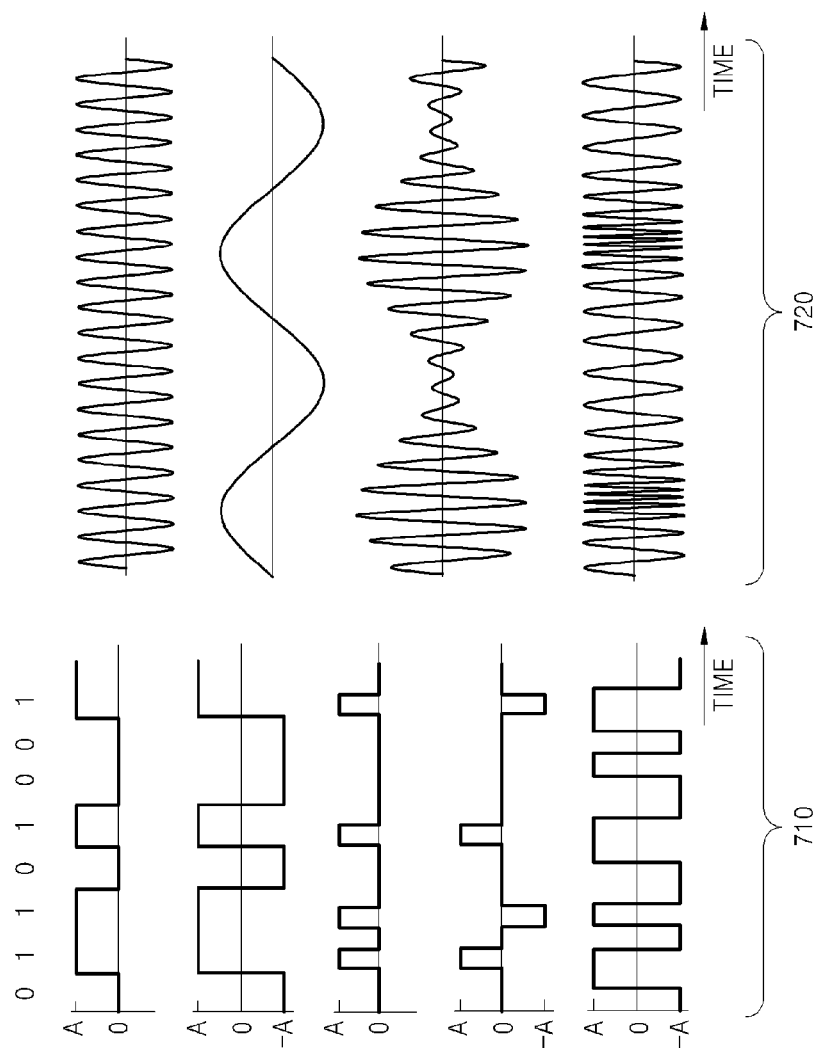
FIG. 7 illustrates examples of a signal that can be communicated through a human body in a communication apparatus having a human body contact sensor according to an embodiment of the present invention.

FIG. 7 illustrates examples of signals that can be communicated by using a communication apparatus according to an embodiment of the present invention. The examples include signals using a pulse modulation method 710 including a Manchester coding and a continuous frequency modulation method 720. In the case of a signal using the pulse modulation method 710, a filter may be used to enhance efficiency of frequency usage and to prevent false positives. According to the communication apparatus of the present invention, a digital signal which has not undergone the continuous frequency modulation may be transmitted and received by using a time division multiplexing method. In this case, the receiver 213 is composed of a circuit for restoring a weak input signal into a digital signal, and a transmitter 215 has a circuit for providing an amplifying function for converting a signal received from the central processing unit 220 into a continuous frequency signal.

The communication apparatus of FIG. 2 can be used even when the same carrier frequency is used in transmitting and receiving processes. In this case, the receiver 213 has a continuous frequency demodulation means, and the transmitter 215 has a continuous frequency modulation means.

Figure 3:
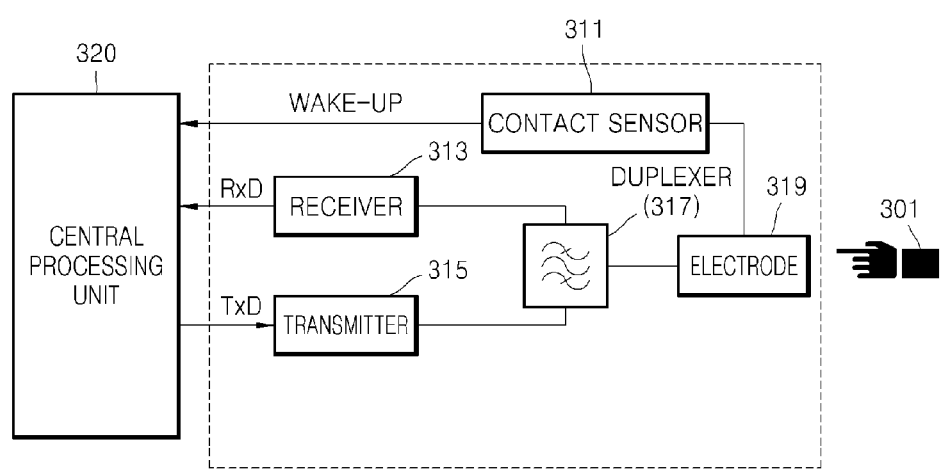
FIG. 3 is a block diagram illustrating a configuration of a frequency division multiplexing communication apparatus having a human body contact sensor according to an embodiment of the present invention.

FIG. 3 is a block diagram illustrating a configuration of a frequency division multiplexing communication apparatus having a human body contact sensor according to an embodiment of the present invention.

FIG. 3 illustrates a configuration of a communication apparatus according to an embodiment of the present invention where different carrier frequencies are used in transmission and reception processes. Since different carrier frequencies are used in transmission and reception processes, a duplexer 317 is used to distinguish paths of input and output signals. By using a continuous frequency demodulation circuit, a receiver 313 restores a signal received through a human body 301 into a digital signal RxD, and outputs the restored digital signal RxD to a central processing unit 320. A transmitter 315 modulates a digital signal TxD received from the central processing unit 320 in continuous frequency modulation method by using a carrier frequency, and outputs the modulated digital signal TxD to the human body 301 via the duplexer 317 and an electrode 319. In this case, unlike in the case of the embodiment shown in FIG. 2, a selection signal from the central processing unit 320 is not necessary.

Figure 4:
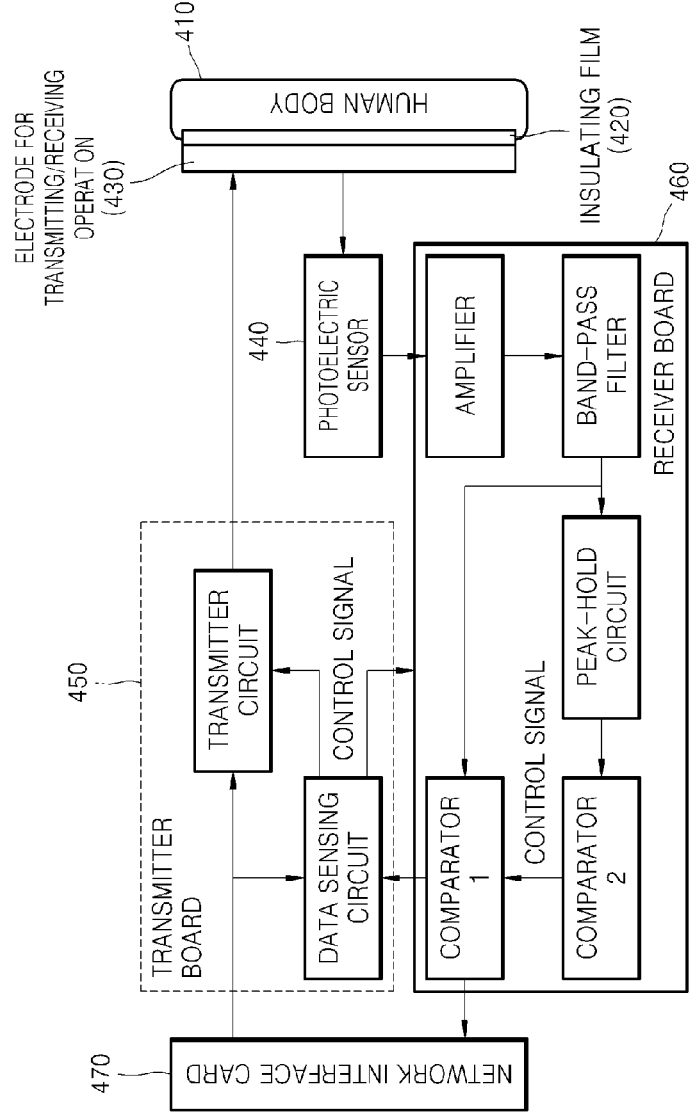
FIG. 4 is a block diagram illustrating a configuration of a communication apparatus using a conventional photoelectric sensor.

FIG. 4 is a block diagram illustrating a configuration of a communication apparatus using a conventional photoelectric sensor. FIG. 4 illustrates a transmitter/receiver circuit using a method capable of detecting an electric field induced to a human body even in a non-contact state by using a conventional photoelectric effect. In this method, a weak electric field input to an electrode 430 for a transmitting/receiving operation when in contact with a human body 410 is formed into an electric signal via a photoelectric sensor 440. An insulating film 420 is attached on a side where the electrode 430 for a transmitting/receiving operation is in contact with the human body 410. A signal received from the photoelectric sensor 440 is transmitted to a network interface card 470 via a receiver 460. A signal receiving from the network interface card 470 is transmitted to the human body 410 via a transmitter 450. The functions of the transmitter 450 and the receiver 460 can be understood by those skilled in the art, and thus detailed descriptions thereof will be omitted.

Meanwhile, in this case, more power is consumed even if data transmission is implemented to be faster than that in the method used in FIGS. 2 and 3.

Figure 5:
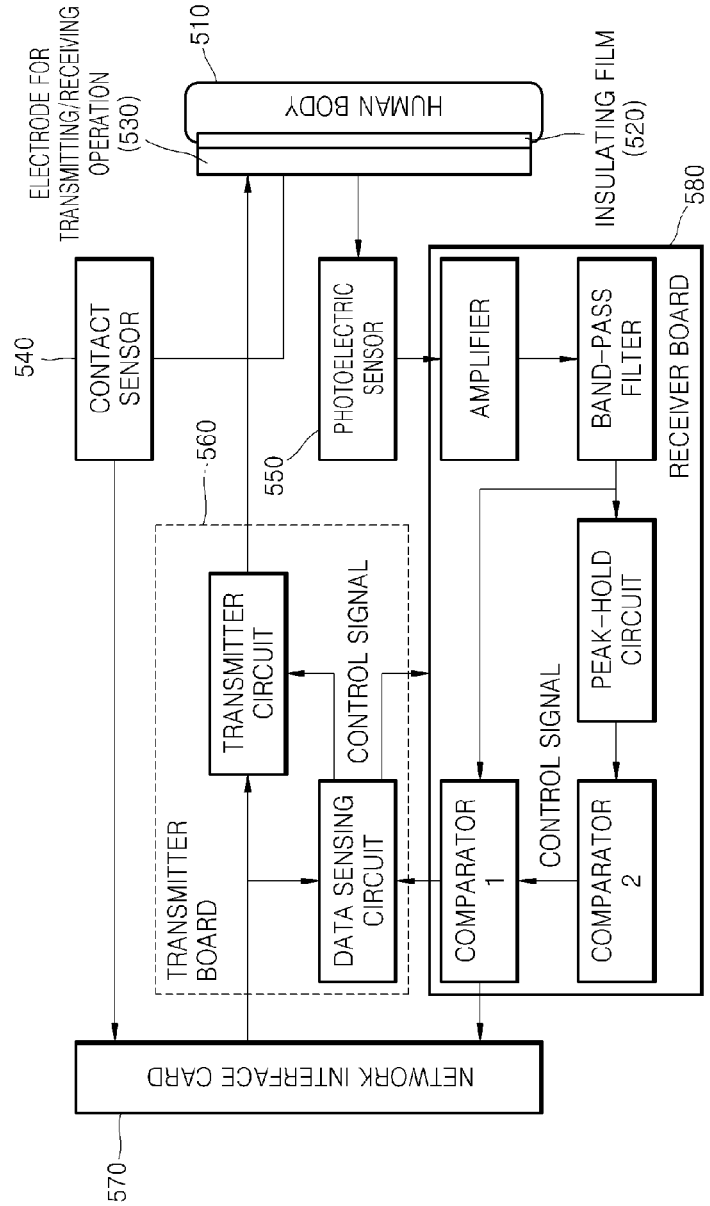
FIG. 5 is a block diagram illustrating a configuration of a communication apparatus using a photoelectric sensor having a contact sensor according to an embodiment of the present invention.

Therefore, a communication apparatus of FIG. 5 according to another embodiment of the present invention has a configuration in which a contact sensor 540 is additionally provided to significantly improve on the conventional method shown in FIG. 4. The contact sensor 540 uses a conductive contact pad connected to an electrode 530 for a transmitting/receiving operation, and thus whether the contact pad approaches to a human body 510 in a non-contact state is determined even when contact is not made, so as to reduce power consumption by not using a photoelectric sensor 550, a transmitter 560, and a receiver 580 which consume a lot of power until contact is made. The functions of the transmitter 560 and the receiver 580 can be understood by those skilled in the art, and thus detailed descriptions thereof will be omitted.

Figure 8:
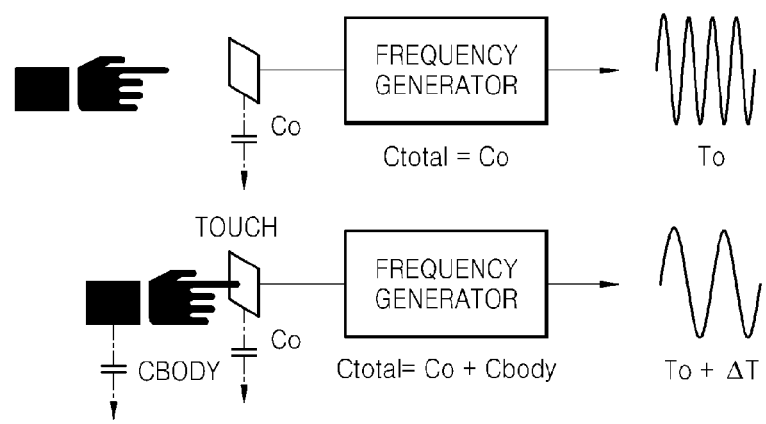
FIG. 8 illustrates an operating principle of a conventional capacitive contact sensor.
Figure 9:
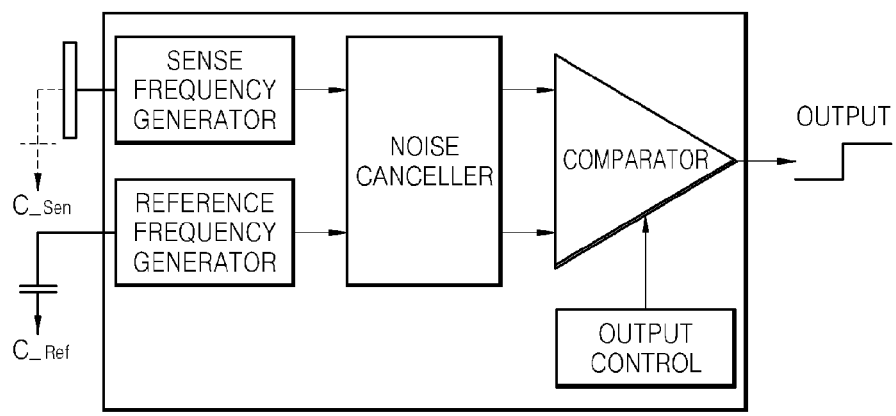
FIG. 9 is a block diagram illustrating a configuration of a conventional capacitive contact sensor.

FIG. 8 illustrates an operating principle of a contact sensor. When there is no human body contact, a natural oscillating frequency based on a reference capacitance is generated. When there is human body contact, a load capacitance changes, and thus, a change in an oscillating frequency is produced so that an output signal is generated via a comparator. This circuit configuration is shown in FIG. 9. The operating principle of the contact sensor is also understood by those skilled in the art, and thus detailed descriptions thereof will be omitted.

Figure 10:
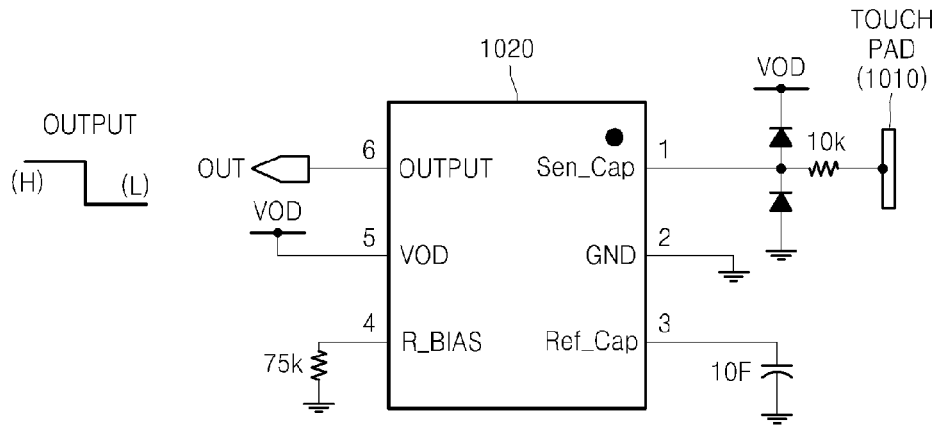
FIG. 10 illustrates a conductive pad (electrode) using a contact sensor according to an embodiment of the present invention.
Figure 11:
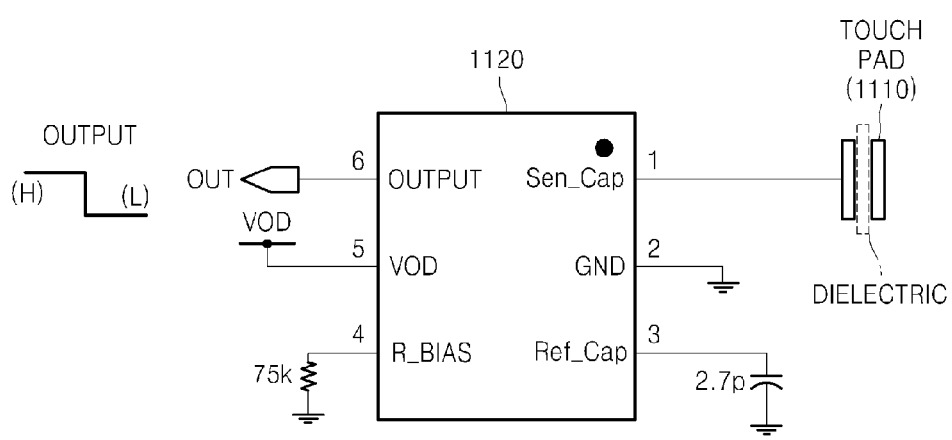
FIG. 11 illustrates a conductive pad (electrode) using a contact sensor when in a non-contact state according to an embodiment of the present invention.

FIG. 10 illustrates a case of using a single channel contact sensor 1020 employing a conductive contact pad 1010 according to an embodiment of the present invention. FIG. 11 illustrates a case of using a single channel contact sensor 1120 employing a conductive non-contact pad 1110 according to an embodiment of the present invention. The single channel contact sensor 1120 can be used in the communication apparatus having the non-contact electrode for a transmitting/receiving operation of FIG. 5. Although the electrode (a contact pad) for a transmitting/receiving operation is constructed to be a signal channel in the present embodiment, if the electrode for a transmitting/receiving operation is constructed in plural in order to maintain a stable contact with a human body, a multi-channel sensor may be used.

When a contact sensor is used, contact sensitivity can be controlled by controlling a reference capacitance. When a sensor that is set to have high contact sensitivity is used, it is possible to detect a human body approaching a distance of a few mm to cm within a contact pad (or an electrode). In this case, by controlling a time required for a micro processing unit to reach a normal state from a stand-by state and a time for a transmitter/receiver circuit to reach a normal state, it is possible to prepare to form a channel at the same time when contact is made.

The circuit constituting a contact sensor that can be used in the present invention can use not only a conductive contact sensor but also a sensor that can sense pressure and other human contact.

The aforementioned micro-controller may be embedded into a communication apparatus. However, a function of a micro processing unit for in a possible human communication device, such as a mobile phone, a personal digital assistant (PDA), an MP3, a portable video information device, a personal computer (PC), a notebook computer, a printer, etc., may be included in the corresponding device.

The communication apparatus having human body contact sensing function according to the present invention may be used when communication is achieved between portable devices, between a portable device and a fixed device, and between fixed devices through a human body as a communication medium.

Accordingly, in a communication apparatus having a human body contact sensing function and a method thereof, in order to reduce power consumption when in a stand-by state before human body contact is made with the communication apparatus which uses a human body as a communication medium, a human body contact sensor is inserted so as to minimize power consumption of a micro processing unit and a transmitter/receiver circuit until contact occurs. Therefore, since power consumption is minimized when in a stand-by mode by using a contact sensor having significantly low power consumption, there is an advantage in that a stand-by time of a portable device is extended.

That is, since a contact sensing function is additionally provided to determine whether a human body comes in contact with an electrode for transmitting and receiving a signal, it is possible to reduce unnecessary power consumption which may be produced until human body contact is made.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

Further embodiments may include a control signal generator unit and a signal analyzer unit. These embodiments will now be discussed with respect to FIGS. 13-16.

Figure 13:
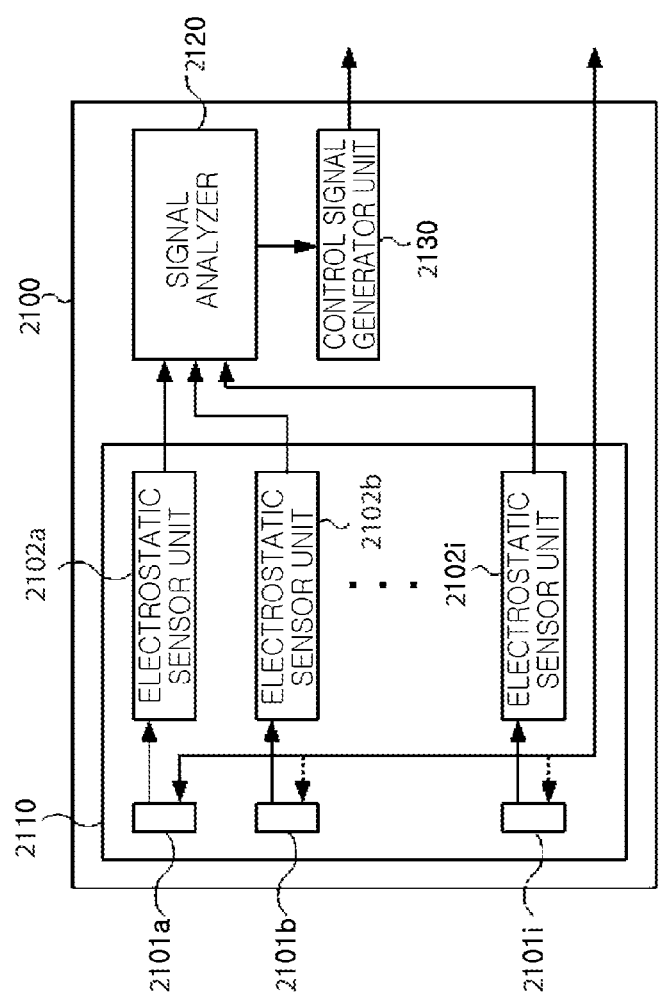
FIG. 13 is a block diagram illustrating a configuration of a human body communication apparatus including a plurality of electrodes and an electrostatic sensor unit according to an embodiment of the present invention.

FIG. 13 is a block diagram illustrating a configuration of a human body communication apparatus using human body contact sensing. Referring to FIG. 13, the human body communication apparatus 2100 may include a contact sensor unit 2110, a signal analyzer unit 2120, and a control signal generator unit 2130.

The contact sensor unit 2110 includes a plurality of electrodes 2101a to 2101i giving/taking a signal to/from a human body, and a plurality of electrostatic sensor units 2102a to 2102i functioning to detect an electrostatic capacity generated by contact and proximity. Here, at least one electrode out of a plurality of the electrodes is coupled to a transmission/reception unit or modem for human body communications, and at least one electrode coupled to the transmission/reception unit or modem forms a continuous contact point with the human body during a period of human body communications.

The signal analyzer unit 2120 analyzes an electrical signal outputted from a plurality of the electrostatic sensor units 2102a to 2102i of the contact sensor unit 2110. The control signal generator unit 2130 receives the signals analyzed by the signal analyzer unit 2120 to generate a control signal.

The human body communication apparatus as configured thus couples signals between at least one electrode of the electrodes 2101a to 2101i that are in contact with the human body and the transmission/reception unit or modem for human body communications when the certain changed patterns in given electrostatic capacity are generated by a user. In this procedure, it is possible to improve standby time characteristics of the mobile devices used for the human body communication by minimizing its power consumed due to the erroneous operations when a user is in contact with and approaches the devices for the purpose of other uses other than human body communication.

The human body communication apparatus according to one exemplary embodiment of the present invention, as configured thus, will be described in detail with reference to the accompanying drawings. Here, the human body communication apparatus according to an exemplary embodiment of the present invention is a human body communication apparatus having a time division duplex system.

Figure 14:
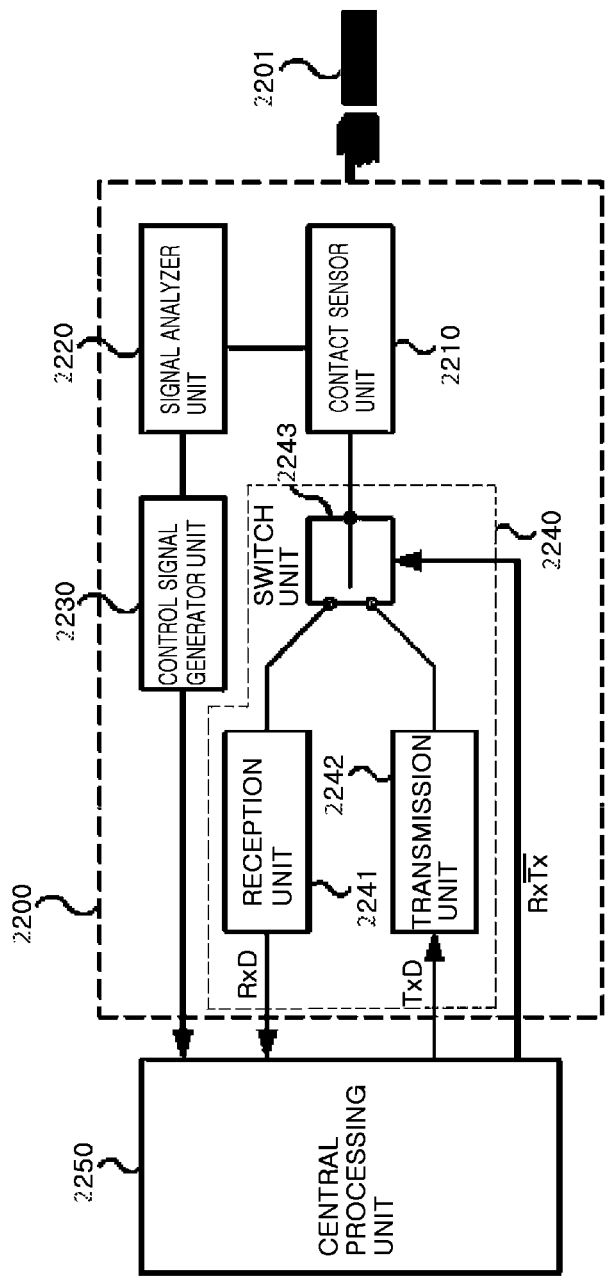
FIG. 14 is a block diagram illustrating a configuration of a human body communication apparatus using a time division duplexer including a human body contact sensor unit according an embodiment of the present invention.

FIG. 14 is a block diagram illustrating a configuration of a human body communication apparatus using time division duplex system including a human body contact sensor unit according to one exemplary embodiment of the present invention. Referring to the FIG. 14, the human body communication apparatus 2200 having a time division duplex system is usable in the use of same carrier frequencies to both transmit a frequency and a receive frequency, and includes a contact sensor unit 2210, a signal analyzer unit 2220, and a control signal generator unit 2230, as shown in FIG. 13. Here, the human body communication apparatus 2200 may further include a data signal processor unit 2240 having a time division multiplex system.

Here, the data signal processor unit 2240 may be composed of a reception unit 2241, a transmission unit 2242, and a switch unit 2243. In this case, the reception unit 2241 has a continuous frequency demodulation means, and the transmission unit 2242 includes a continuous frequency modulation means. The switch unit 2243 selects the transmission of a data signal to the human body 2201 or the reception of a data signal from the human body 2201 according to the control signal generated from the control signal generator unit 2230. Here, the baseband signal includes a UWB signal having a very short pulse cycle as a spreading and channel-encoded signal in which characteristics of the communication channels are reflected.

The control signal generator unit 2230, the reception unit 2241 and the transmission unit 2242 are coupled to a central processing unit (CPU) 2250. The contact sensor unit 2210 includes a plurality of electrodes and a plurality of electrostatic sensor units.

Next, an embodiment of the human body communication apparatus having a time division multiplex system, as configured thus, will be described in detail.

The contact sensor unit 2210 senses an electrostatic capacity (or a magnetic field) changed through contact with the human body 2201 to generate an electrical signal, and transmits the generated electrical signal to the signal analyzer unit 2220. Then, the signal analyzer unit 2220 analyzes a signal as a user's intention from an electrical signal pattern generated by the change in electrostatic capacity. The analyzed signal is inputted into the control signal generator unit 2230. As a result, the control signal generator unit 2230 confirms the analyzed signal, and then generates a wake-up signal as a control signal in the central processing unit 2250. The output of the control signal generator unit 2230 makes it possible to apply a signal so that the central processing unit 2250 can normally operate in a standby mode, and also controls a power supply of the data signal processor unit 2240.

The central processing unit 2250, which operates with the reception of the control signal, transmits a transmitted data signal (TxD) to the transmission unit 2242. The transmission unit 2242 converts the transmitted data signal (TxD) into a baseband signal, and transmits the converted baseband signal to the contact sensor unit 2210 through the switch unit 2243. Then, the contact sensor unit 2210 applies the baseband signal to the human body 2201 that is in contact with at least one electrode.

In this case, the contact sensor unit 2210 senses an electrostatic capacity that is changed through the contact with human body coupled to the electrode, and transmits the sensed electrical signal as a baseband signal to the reception unit 2241 through the switch unit 2230. The reception unit 2241 converts the transmitted baseband signal into a received data signal (RxD) as a digital signal, and transmits the converted digital signal to the central processing unit 2250.

Subsequently, the above-mentioned human body communication apparatus according to another exemplary embodiment of the present invention will be described in more detail with reference to the accompanying drawings. As a human body communication apparatus having a time division duplex system using a human body contact sensor unit in the use of different carrier frequencies such as transmit frequency and receive frequency, the human body communication apparatus according to another exemplary embodiment of the present invention will be described in detail with reference to the accompanying drawings.

Figure 15:
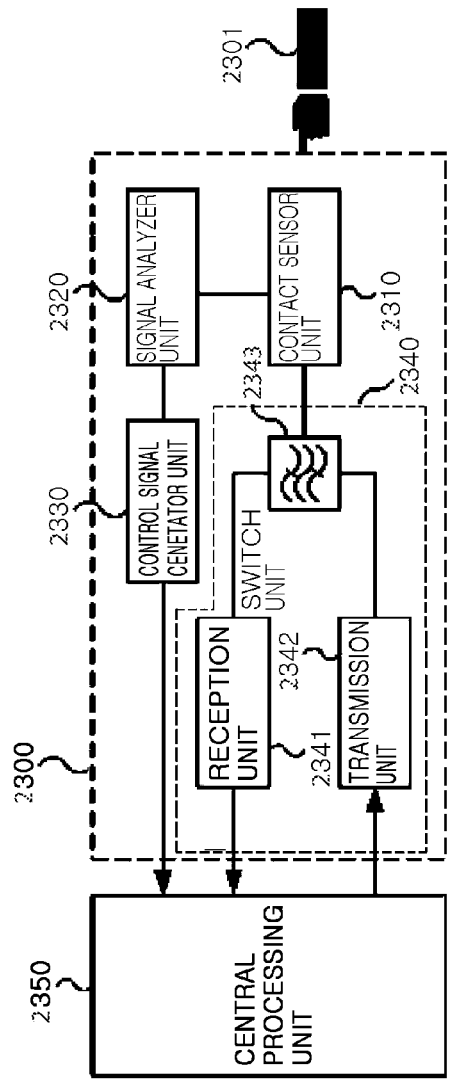
FIG. 15 is a block diagram illustrating a configuration of a human body communication input/output apparatus using a frequency division duplexer including a human body contact sensor unit an embodiment of the present invention.
Figure 16:
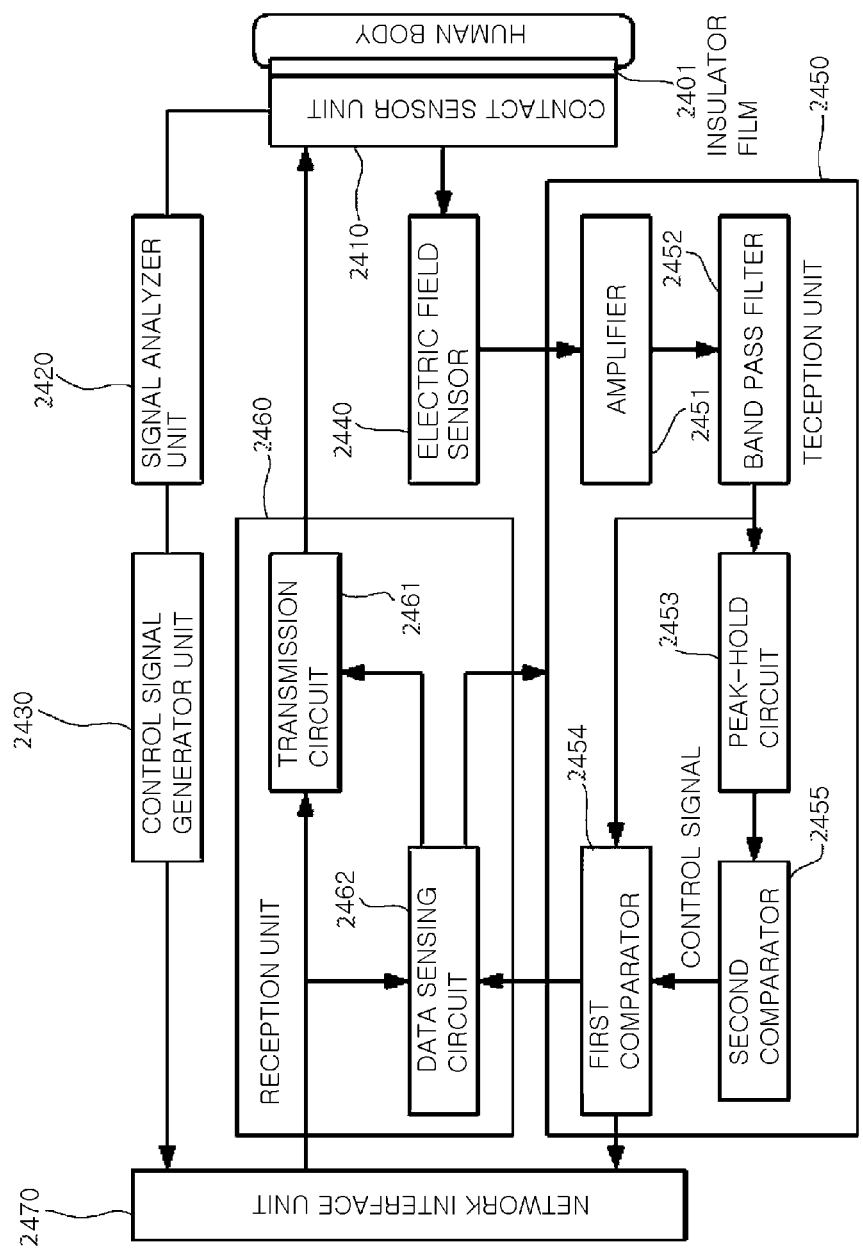
FIG. 16 is a block diagram illustrating a configuration of a human body communication input/output apparatus using an electric field sensor according to an embodiment of the present invention.

FIG. 15 is a block diagram illustrating a configuration of a frequency-divided human body communication input/output apparatus having a human body contact sensor unit according to another exemplary embodiment of the present invention. Referring to FIG. 15, the human body communication apparatus 2300 with a frequency division system includes a duplexer 2343 for dividing paths of two signals in the use of the different carrier frequencies such as transmit frequency and receive frequency, and also may include a contact sensor unit 2310, a signal analyzer unit 2320, a control signal generator unit 2330, and a data signal processor unit 2340. Here, the data signal processor unit 2340 includes a reception unit 2341 and a transmission unit 2342 and a duplexer 2343.

Next, an operation of the human body communication apparatus with a frequency division system, as configured thus, will be described in detail.

The contact sensor unit 2310 senses an electrostatic capacity (or a magnetic field) that is changed through the contact with the human body 2301 to generate an electrical signal, and transmits the generated electrical signal to the signal analyzer unit 2320. Then, the signal analyzer unit 2320 analyzes a signal as a user's intention from an electrical signal pattern generated by the change in electrostatic capacity. The analyzed signal is inputted into the control signal generator unit 2330. As a result, the control signal generator unit 2330 confirms the analyzed signal, and then generates a wake-up signal as a control signal in the central processing unit 2350. The output of the control signal generator unit 2330 makes it possible to apply a signal so that the central processing unit 2350 can normally operate in a standby mode, and also controls a power supply of the data signal processor unit 2340. Therefore, the central processing unit 2350 operates according to the control signal to transmit a transmitted data signal (TxD) as a digital signal to the transmission unit 2342.

Therefore, the transmission unit 2342 converts the received transmitted data signal (TxD) into a baseband signal, subjects the converted baseband signal to a continuous frequency modulation process using a carrier frequency, and transmits the baseband signal to the contact sensor unit 2310 through the duplexer 2343. Therefore, the contact sensor unit 2310 applies the received signal to the human body 2301. Unlike as shown in FIG. 14, a selection signal from the central processing unit 2350 is required in this case.

In this case, the contact sensor unit 2310 senses an electrical signal from the human body 2301 that is in contact with internal electrodes, converts the sensed electrical signal into a received data signal (RxD) as a digital signal, and transmits the converted digital signal to the reception unit 2341 through the duplexer 2343. Therefore, the reception unit 2341 restores the signal, which is received through the human body 2301, into a received data (RxD) as a digital signal by using a continuous frequency demodulation circuit, and transmits the restored digital signal to the central processing unit 2350.

Examples of the signals that may communicate using the above-mentioned human body communication apparatus include a pulse-modulated signal and a continuous frequency modulated signal, all of which include Manchester coding. A filter may be used in an output end to enhance the frequency efficiency and limit the spurious frequency in the use of the pulse-modulated signals.

The human body communication apparatus according to the present invention transmits and receives using a digital signal by means of the time division duplex system without any of the continuous frequency modulation of the digital signal. In this case, the reception unit 2341 is composed of circuits for restoring the inputted faint signal into a digital signal, and the transmission unit 2342 may have an amplification function as a circuit for converting a signal received from the central processing unit 2350 into a receivable signal.

Next, the human body communication apparatus according to still another exemplary embodiment of the present invention, which may detect an electric field induced from the human body in a non-contact state using an electro-optic effect, will be described in detail with reference to the accompanying drawings.

FIG. 15 is a block diagram illustrating a configuration of a human body communication apparatus using an electric field sensor according to still another exemplary embodiment of the present invention. Referring to FIG. 15, the human body communication apparatus according to still another exemplary embodiment of the present invention may include a contact sensor unit 2410 in which an insulator film 2401 is attached to a region that is in contact with a human body, a signal analyzer unit 2420, a control signal generator unit 2430, an electric field sensor 2440, a reception unit 2450, a transmission unit 2460, and a network interface unit 2470.

The contact sensor unit 2410 includes contact pads having conductivity, for example a transceiver electrode and an electrostatic sensor unit. Here, the electric field sensor 2440, the reception unit 2450 and the transmission unit 2460, all of which have high power consumption prior to the human body communication, may cut down their power consumption by analyzing certain patterns of a user for the human body communications.

The reception unit 2450 includes an amplifier 2451 for amplifying a signal received from the electric field sensor 2440, a band pass filter 2452 for filtering the amplified signal, a peak-hold circuit 2453 and first and second comparators 2454 and 2455. The transmission unit 2460 includes a transmission circuit 2461 for generating a transmitting signal, and a data sensing circuit 2462 for transmitting a control signal to the transmission circuit 2461 and the reception unit 2450. Here, it is considered that specific functions of the transmission unit 2460 and the reception unit 2450 may be understood by those skilled in the art, and their detailed descriptions are omitted for clarity.

Next, an operation of the human body communication apparatus according to still another exemplary embodiment of the present invention will be described in detail.

The transmission unit 2460 transmits a received signal inputted from the network interface unit 2470 to the contact sensor unit 2410. Therefore, the contact sensor unit 2410 applies the received signal to a human body through an insulator film 2401.

Subsequently, the contact sensor unit 2410 senses a faint electric field through the insulator film 2401 in the human body with it being in non-contact with the human body, and then transmits the sensed electric field signal to the signal analyzer unit 2420 and the electric field sensor 2440. Therefore, the signal analyzer unit 2420 analyzes the electric field signal received from the contact sensor unit 2410, and transmits the analyzed electric field signal to the control signal generator unit 2430. Then, the control signal generator unit 2430 confirms the analyzed signal to generate a control signal in the network interface unit 2470.

In this case, the electric field sensor 2440 converts the faint electric field signal inputted from the contact sensor unit 2410 into an electrical signal, and then transmits the converted electrical signal to the reception unit 2450. Therefore, the reception unit 2450 transmits the received electrical signal to the network interface unit 2470.

According to the exemplary embodiments of the present invention as described above, an operation principle of a contact sensor constituting the contact sensor units is that a natural oscillation frequency is generated by the reference electrostatic capacity when there is no contact with the human body and a load electrostatic capacity is changed when in contact with the human body, and therefore an output signal is generated through comparators due to the changes in oscillation frequency. It is considered that the operation principle of the contact sensor may be easily understood by those skilled in the art, and therefore detailed description of the operation principle omitted for clarity.

The electrodes used in the present invention may be composed of conductive materials to sense the direct contact with a human body, and also composed of conductive materials coated with dielectrics. Also, each of the electrodes may be composed of multi-channel sensors when a plurality of transceiver electrodes are formed to maintain stable contact points with a human body.

The contact-type sensor-driven electrostatic sensor unit may control the contact sensitivity by controlling the reference electrostatic capacity, and the sensors that are set to have high contact sensitivity so they may sense the proximity when a distance between the contact pads (or electrodes) and the human body ranges from several millimeters (mm) to several centimeters (cm). In this case, it is possible to reduce the time, which spans from the delivery of a user's intention for human body communication to the actual communication, and also to reduce the time when a transceiver circuit comes to a normal state, by controlling the time until a control signal is generated through the signal analyzer unit.

The micro controller disclosed in the present invention may be installed inside the communication input/output apparatus, but micro controllers may be used in devices for human body communication, for example, a hand phone, PDA, an MP3 layer, a portable image information system, PC, a notebook computer, a printer, etc.

The communication input/output apparatus for sensing a human body contact according to the present invention may be used for the communication between mobile devices, the communications using a human body as a medium between the mobile devices and fixed devices and between the fixed device and fixed device, etc.

The functions of the apparatus and method disclosed in this application may be realized as computer-readable codes in computer-readable recording media. The computer-readable recording media include all kinds of recording devices in which data that are readable by a computer system are being stored. Examples of the computer-readable recording media include ROM, RAM, CD-ROM, a magnetic tape, a floppy disk, an optical data storage device, etc., and may be also realized in the form of a carrier wave (for example, transmission through the internet). In addition, the computer-readable recording media may be distributed into the computer system that is connected through the networks to store and implement the computer-readable codes in a distribution mechanism. Furthermore, functional programs, codes and code segments, all of which are used to practice the present invention may be easily deduced by programmers in the art to which the present invention belongs.

Embodiments of the present invention may include the following features:

1. A communication apparatus having a human body contact sensing function wherein the communication apparatus performs communication in contact with a central processing unit and a human body, the communication apparatus comprising: an electrode that comes in contact with the human body; a contact sensor that is connected to the electrode, and instructs the central processing unit to perform an initial operation if contact with the human body is sensed; and a data processing unit that receives a control signal from the central processing unit so as to select whether to transmit or receive data, and performs a transmitting or receiving operation according to the control signal.

2. The communication apparatus of item 1, wherein the contact sensor instructs the central processing unit to perform the initial operation by sensing direct contact between the human body and the electrode or by sensing approach of the human body.

3. The communication apparatus of item 2, wherein the contact sensor instructs the central processing unit to perform the initial operation by generating a signal having a constant value while the contact is maintained, by generating a signal having pulses of a constant width from the moment when the contact is made, or by generating a signal using a positive or negative trigger method.

4. The communication apparatus of item 1, wherein the data processing unit performs transmitting and receiving of the data by using a time-division method.

5. The communication apparatus of item 4, wherein the data processing unit comprises: a first receiver that restores a base-band signal received through the human body into an original digital signal; a first transmitter that outputs a signal received from the central processing unit to the human body as a base-band signal; and a first switch that is connected to the transmitter and the receiver, and selects whether to transmit or receive the data to/from the human body in response to the control signal.

6. The communication apparatus of item 5, wherein the base-band signal includes an ultra wide band (UWB) signal which has undergone spreading and channel coding based on a communication channel feature, and has a significantly short pulse period.

7. The communication apparatus of item 1, wherein the data processing unit uses a continuous frequency modulation method in which the same carrier frequency is used when data is transmitted and received.

8. The communication apparatus of item 7, wherein the continuous frequency modulation method using the same carrier frequency includes a single carrier modulation method and a multiple carrier modulation method.

9. The communication apparatus of item 7, wherein the data processing unit further comprises: a second receiver that restores a signal received through the human body into a digital signal by using a continuous frequency demodulation method; a second transmitter that modulates a digital signal received from the central processing unit into a continuous frequency signal by using a continuous frequency modulation method, and outputs the continuous frequency modulated signal to the human body; and a second switch that is connected to the transmitter and the receiver, and selects whether to transmit or receive the data to/from the human body in response to the control signal.

10. The communication apparatus of item 1, wherein the data processing unit further performs transmitting and receiving of the data by using a continuous frequency modulation method in which a transmission carrier frequency is different from a reception carrier frequency.

11. The communication apparatus of item 10, wherein the data processing unit further comprises: a third receiver that restores a signal received through the human body by using a continuous frequency demodulation method into a digital signal; a third transmitter that modulates a digital signal received from the central processing unit into a continuous frequency signal by using a continuous frequency modulation method, and outputs the continuous frequency modulated signal to the human body; and a duplex that distinguishes paths for the transmission signal and the reception signal which have undergone the continuous frequency modulation.

12. The communication apparatus of item 1, wherein the contact sensor comprises a multi-channel sensor if the electrode is provided in plural.

13. A communication apparatus having a human body contact sensing function, the communication apparatus comprising: an electrode that comes in contact with a human body; a sensor that converts an electric field input through the electrode into an electric signal; a data processing unit that restores the electric signal into original data to be transmitted to an external device, and converts data received from the external device to output the received data to the electrode; and a contact sensor that generates and outputs a sensing signal used to detect whether contact is made with the human body and indicates the result of detection so that the external device can recognize the result, and that comprises a multi-channel sensor if the electrode is provided in plural.

14. The communication apparatus of item 13, wherein the external device performs an initial operation in response to the sensing signal.

15. The communication apparatus of item 13, wherein the contact sensor generates the sensing signal by sensing direct contact with the human body or by sensing approach of the human body.

16. A communication method having a human body contact sensing function wherein the communication method performs communication in contact with a central processing unit and a human body, wherein the communication method comprising: (a) determining whether contact is made with the human body; (b) instructing the central processing unit to perform an initial operation if the determination result is positive; and (c) transmitting or receiving data in response to a control signal from/to the central processing unit which has performed the initial operation.

17. The communication method of item 16, wherein in (a), it is determined that the contact is made when direct contact occurs with the human body or when a distance from the human body is within a predetermined distance.

18. The communication method of item 16, wherein in (c), the data is transmitted or received by using a time division method.

19. The communication method of item 16, wherein in (c), a continuous frequency modulation method is further performed in which the same carrier frequency is used when the data is transmitted and received.

20. The communication method of item 16, wherein in (c), the transmitting and receiving of the data is further performed by using a continuous frequency modulation method in which a transmission carrier frequency is different from a reception carrier frequency.

While the present invention has been particularly shown and described with reference to exemplary embodiments thereof, it will be understood by those skilled in the art that various changes in form and details may be made therein without departing from the spirit and scope of the present invention as defined by the appended claims.

What is claimed is:

1. A human body communication apparatus, comprising:
a plurality of contact sensor units including a plurality of electrodes configured to contact a human body and having conductivity;
a plurality of electrostatic capacity sensor units coupled to the electrodes and configured to sense a change in electrostatic capacity as a result of contact with the human body, and further configured to generate a contact signal using the sensed electrostatic capacity;
a signal analyzer unit configured to analyze the contact signal received from the contact sensor units to determine a user intent;
a central processing unit configured to process information received through the electrodes;
a control signal generator unit configured to generate a first control signal as the analysis result in the signal analyzer unit, wherein the first control signal is transmitted to the central processing unit as a wake-up signal to control a power state of the central processing unit; and
a data signal processor unit configured to transmit and receive a data signal to and from external devices,
wherein the data signal processor unit is configured to transmit and receive the data signal through a frequency division system using a frequency modulated continuous wave mode in which a transmitting carrier frequency and receiving carrier frequency are different to each other.

2. A human body communication apparatus, comprising:
a plurality of contact sensor units including a plurality of electrodes configured to contact a human body and having conductivity;
a plurality of electrostatic capacity sensor units coupled to the electrodes and configured to sense a change in electrostatic capacity as a result of contact with the human body, and further configured to generate a contact signal using the sensed electrostatic capacity;
a signal analyzer unit configured to analyze the contact signal received from the contact sensor units to determine a user intent;
a central processing unit configured to process information received through the electrodes;
a control signal generator unit configured to generate a first control signal as the analysis result in the signal analyzer unit, wherein the first control signal is transmitted to the central processing unit as a wake-up signal to control a power state of the central processing unit; and
a data signal processor unit configured to transmit and receive a data signal to and from external devices, wherein the data signal processor unit is configured to transmit and receive the data signal through a time division multiplex system, and wherein the data signal processor unit comprises a reception unit for restoring the baseband signal sensed from the human body to an original digital signal;

a transmission unit for applying the received data signal received from the external device as a baseband signal to the human body; and a switch unit coupled to the transmission unit and the reception unit to select the transmission to the human body or the reception from the human body according to a second control signal.

3. A human body communication apparatus, comprising:

a plurality of contact sensor units including a plurality of electrodes configured to contact a human body and having conductivity;

a plurality of electrostatic capacity sensor units coupled to the electrodes and configured to sense a change in electrostatic capacity as a result of contact with the human body, and further configured to generate a contact signal using the sensed electrostatic capacity;

a signal analyzer unit configured to analyze the contact signal received from the contact sensor units to determine a user intent;

a central processing unit configured to process information received through the electrodes;

a control signal generator unit configured to generate a first control signal as the analysis result in the signal analyzer unit, wherein the first control signal is transmitted to the central processing unit as a wake-up signal to control a power state of the central processing unit; and a data signal processor unit configured to transmit and receive a data signal to and from external devices, wherein the data signal processor unit is configured to transmit and receive the data signal through a time division multiplex system, and wherein the data signal includes a ultra wide band (UWB) signal having a very short pulse cycle as a spreading and channel-encoded signal in which characteristics of the communication channels are reflected.

4. A human body communication apparatus, comprising:

a plurality of contact sensor units including a plurality of electrodes configured to contact a human body and having conductivity;

a plurality of electrostatic capacity sensor units coupled to the electrodes and configured to sense a change in electrostatic capacity as a result of contact with the human body, and further configured to generate a contact signal using the sensed electrostatic capacity;

a signal analyzer unit configured to analyze the contact signal received from the contact sensor units to determine a user intent;

a central processing unit configured to process information received through the electrodes;

a control signal generator unit configured to generate a first control signal as the analysis result in the signal analyzer unit, wherein the first control signal is transmitted to the central processing unit as a wake-up signal to control a power state of the central processing unit; and a data signal processor unit configured to transmit and receive a data signal to and from external devices;

wherein the data signal processor unit is configured to transmit and receive the data signal through a time division multiplex system, and wherein the data signal processor unit comprises:

an electric field sensor unit configured to convert the received data signal, in the form of an electric field signal induced from the contact sensor unit, into an electrical signal when there is no contact with the human body;

a reception unit configured to restore the electrical signal received from the electric field sensor unit to an original digital signal; and a transmission unit configured to apply the transmitted data signal, received from the external device, as a baseband signal to the human body.

5. The human body communication apparatus of claim 1, wherein the data signal processor unit comprises:

a reception unit configured to subject the received data signal received from the contact sensor unit using a continuous frequency demodulation process, and further configured to restore the received data signal to an original digital signal;

a transmission unit configured to subject the transmitted data signal, in the form of a digital signal received from the external device, to a continuous frequency modulation process, and further configured to apply the transmitted data signal to the human body; and a duplexer configured to divide paths of the transmitted data signal and the received data signal.

6. The human body communication apparatus of claim 2, wherein the transmission unit is configured to process the transmitted data signal inputted from the external device with a frequency modulated continuous wave mode using the same carrier frequency.

7. The human body communication apparatus of claim 2, wherein the reception unit is configured to process the received data signal transmitted from the contact sensor unit with the frequency demodulated continuous wave mode.

* * * * *